United States Patent
Pepperine et al.

[11] Patent Number: 6,126,191
[45] Date of Patent: Oct. 3, 2000

[54] AIR BAG MODULE ASSEMBLY

[75] Inventors: Dean Michael Pepperine, Mesa, Ariz.; James A. Barnard, Centerville; Jeffrey Alan Shepherd, Troy, both of Ohio

[73] Assignee: General Motors Corporation, Detroit, Mich.

[21] Appl. No.: 09/039,693

[22] Filed: Mar. 16, 1998

[51] Int. Cl.$^7$ .................................................. B60R 21/16
[52] U.S. Cl. ...................................... 280/728.2; 280/732
[58] Field of Search ................................ 280/728.2, 732, 280/728.1, 731, 743.1; 224/557; 220/23.87, 23.89, 23.91, 787, 788

[56] References Cited

U.S. PATENT DOCUMENTS

| | | |
|---|---|---|
| 5,445,409 | 8/1995 | Abramszyk et al. . |
| 5,454,588 | 10/1995 | Rose ..................................... 280/728.2 |
| 5,490,689 | 2/1996 | Garner et al. ......................... 280/728.2 |
| 5,588,669 | 12/1996 | Leonard et al. . |
| 5,630,610 | 5/1997 | Murakami et al. ................... 280/728.2 |
| 5,709,402 | 1/1998 | Leonard ................................ 280/728.2 |

*Primary Examiner*—Paul N. Dickson
*Assistant Examiner*—Faye M. Fleming
*Attorney, Agent, or Firm*—Kathryn A. Marra

[57] ABSTRACT

An air bag assembly includes an air bag having a mouth portion having a plurality of alternating cushion tabs and cushion notches. The air bag assembly also includes a housing having a plurality of resilient clips thereon. An air bag retainer including at least one rod portion extends between at least two cushion tabs and extends across the cushion notches to define cushion openings. The cushion openings are adapted for receiving the clips therethrough such that the rod portion is snap-fittedly engaged beneath the clips to secure the air bag to the housing. Preferably, the clips each include a downwardly extending spring leg portion and a clip pocket shaped for closely receiving the rod portion therein such that the rod portion is snap-fittedly engaged with the clip pocket. Also preferably, the vehicle includes a vehicle panel and the vehicle panel pushes against the clips to trap the rod portion in the clips when the module is installed in the vehicle.

11 Claims, 3 Drawing Sheets

AIR BAG MODULE ASSEMBLY

TECHNICAL FIELD

This invention relates to an air bag module including an improved cushion retainer attachment and an improved cover door arrangement.

BACKGROUND OF THE INVENTION

It is well known in the prior art to provide an air bag module which is mounted forward of a vehicle passenger beneath an instrument panel cover having an opening therein through which the air bag deploys. The module typically includes an air bag and an inflator for generating gas to deploy the air bag upon the sensing of certain predetermined vehicle conditions. The instrument panel opening is typically closed by a cover door which is attached to either the instrument panel cover or the housing of the air bag module. Typically, when the cover door is attached to the housing, much of the weight of the air bag module, including the housing, air bag, and inflator, must be supported by the cover door, especially during installation to the vehicle. Thus, the cover door must be a fairly rigid structural member which does not deform under the weight of the underlying module for an aesthetically pleasing appearance on the instrument panel cover. Furthermore in this arrangement, proper alignment of the cover door within the instrument panel opening is sensitive to the tolerances of the instrument panel cover and the underlying module support structure.

It is also known in the prior art to include an air bag retainer which attaches the air bag to the housing in some manner. Typically, the air bag is attached to both the air bag retainer and housing by a plurality of fasteners. It is also known in the prior art for the air bag retainer to be provided by rods attached to the mouth of the air bag. However, elongated channels must be provided in the housing for receiving the rods therein. These elongated channels are difficult to manufacture, especially in stamped or molded housings. Furthermore, the air bag material wrapped around the length of the rod makes axial insertion of the rods into the elongated channels difficult for assembly since the air bag material tends to bunch up on the rods.

SUMMARY OF THE INVENTION

The present invention provides alternatives and advantages over the prior art by providing an air bag module assembly which has a simple air bag retainer permitting easy assembly of the air bag and air bag retainer to features on the housing, without the use of any fasteners. This invention also advantageously utilizes the same housing features for easy attachment of the cover door to the housing. Advantageously, this housing is designed to interact with the instrument panel to carry the weight of the module, whereby the cover door can be made of a lighter, less structural material. Also advantageously, the less structural cover door includes features making it less sensitive to the tolerance variations of the instrument panel relative to the underlying module support structure.

These alternatives and advantages are accomplished by providing an air bag assembly for use in a vehicle. The air bag assembly has an air bag including a mouth portion having a plurality of alternating cushion tabs and cushion notches. The air bag assembly also includes a housing having a plurality of resilient clips thereon. An air bag retainer including at least one rod portion extends between at least two cushion tabs and extends across the cushion notches to define cushion openings. The cushion openings are adapted for receiving the clips therethrough such that the rod portion is snap-fittedly engaged beneath the clips to secure the air bag to the housing. Preferably, the rod portion is made of a nylon material such that it is recyclable with the air bag.

Preferably, the clips each include a downwardly extending spring leg portion and a clip pocket shaped for closely receiving the rod portion therein such that the rod portion is snap-fittedly engaged with the clip pocket. Also preferably, the vehicle includes a vehicle panel and the vehicle panel pushes against the clips to trap the rod portion in the clips when the module is installed in the vehicle.

In accordance with further aspects of the invention, a housing includes a plurality of downwardly extending clips thereon. A cover door includes an upper show wall and a plurality of flexible cover tabs extend beneath the upper show wall. The cover door also includes a plurality of cover openings positioned between the cover tabs. The clips extend through the cover openings for holding the cover door on the housing such that the flexible cover tabs permit variable positioning of the upper show wall relative to the housing. Preferably, the cover tabs have a height which is greater than a height of the cover openings; and the cover openings are sized for closely receiving the clips therethrough. The cover door preferably includes a downwardly extending side wall having an upper flange and a lower flange and the cover tabs extend between and loosely connect the upper flange to the lower flange such that the cover openings are formed between the upper and lower flanges. Also preferably, the vehicle includes a vehicle panel and the housing includes a knobbed portion protruding outwardly from the housing whereby the knobbed portion engages the vehicle panel to support the air bag module during installation in the vehicle.

In accordance with further aspects of the invention, the housing has exterior sides and includes outwardly extending knobbed portions on the exterior sides. The vehicle includes a vehicle panel having a first opening surrounded by an upper ledge portion and a secondary opening surrounded by a lower ledge portion and positioned beneath the upper ledge portion. Preferably, the secondary opening is smaller than the first opening. The housing is sized for extending entirely through the first opening and partially through the secondary opening. The knobbed portions engage the lower ledge portion such that the air bag module is supported by engagement of the knobbed portions with the lower ledge portion.

BRIEF DESCRIPTION OF THE DRAWINGS

The present invention will now be described, by way of example, with reference to the accompanying drawings in which.

DESCRIPTION OF THE PREFERRED EMBODIMENT

Figure 1:
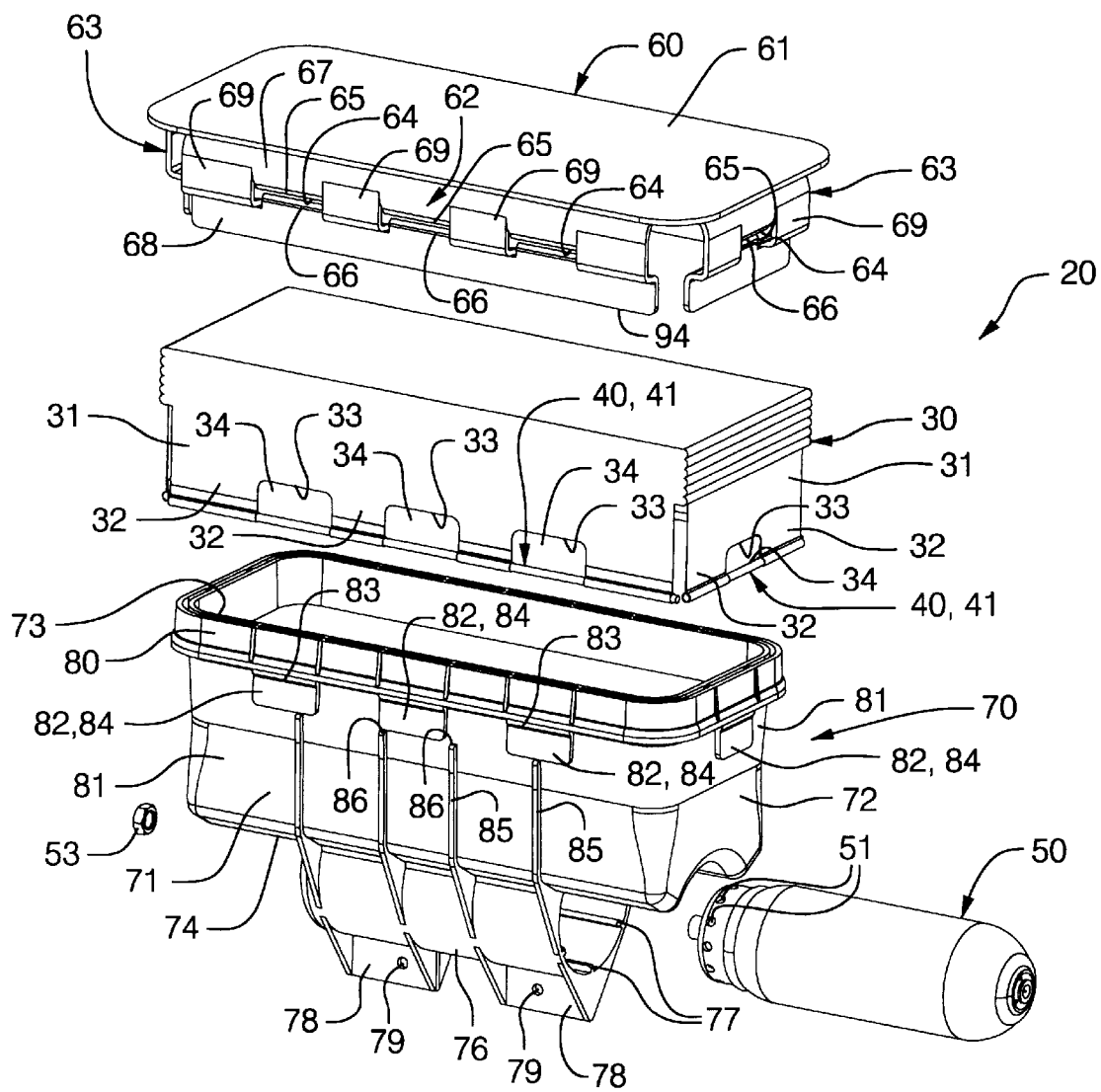
FIG. 1 is an exploded perspective view of an air bag module including a housing, an air bag retainer, an air bag, and a cover door.

Referring to FIG. 1, an air bag module 20 generally includes an air bag 30, an air bag retainer 40, an inflator 50 for generating gas to inflate the air bag 30, a housing 70 for holding the air bag 30 and inflator 50, and a cover door 60. The cover door 60 and the air bag 30 are easily attached to the housing 70 without the use of fasteners, as described further hereinafter.

Figure 3:
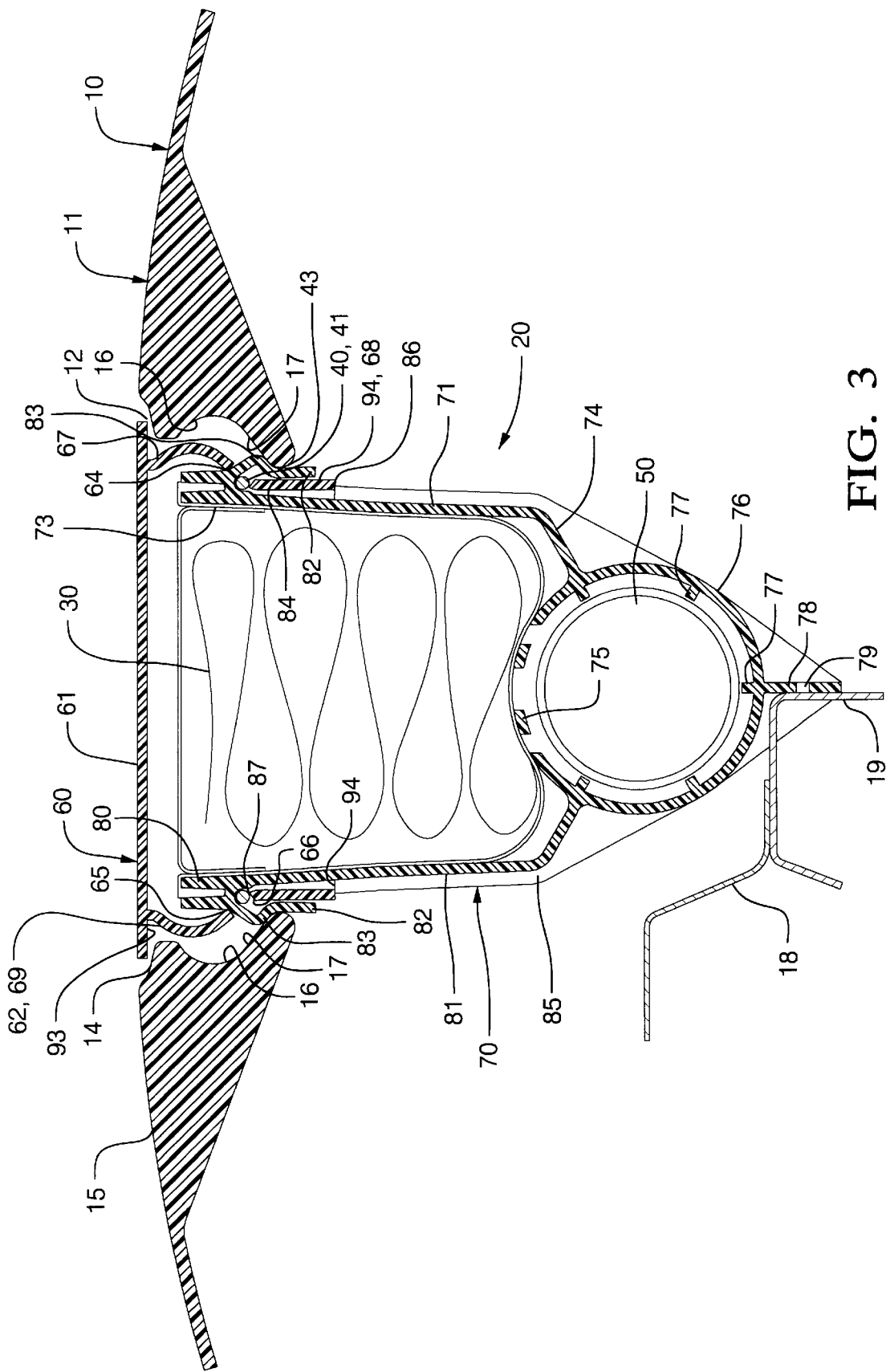
FIG. 3 is a sectional view through the assembled module and surrounding instrument panel structure upon installation in a vehicle.

Referring to FIG. 3, a vehicle 10 includes a vehicle panel, such as an instrument panel 11, including an instrument panel opening 12 which is closed by the cover door 60 prior to air bag deployment. The instrument panel 11 preferably has a greater depth in the area surrounding the instrument panel opening 12. The instrument panel 11 preferably includes an upper ledge portion 14 which is slightly recessed from the upper surface 15 of the instrument panel 11 and which surrounds the instrument panel opening 12. The instrument panel 11 preferably includes an undercut portion 16 located beneath the upper ledge portion 14. The undercut portion 16 terminates in a lower ledge portion 17 which is preferably positioned slightly inward from the upper ledge portion 14 and slightly inward from the instrument panel opening 12 such that a smaller secondary instrument panel opening 43 is formed. The lower ledge portion 17 is preferably made of a sturdy substrate material on the instrument panel 11, such as a sturdy plastic or metal which provides structural strength to support the weight of the air bag module 20, as described further hereinafter. Suitable module support structure 18 below the instrument panel 11 includes a mounting portion 19 which is spaced beneath the instrument panel 11 by a predetermined distance within a predetermined tolerance for attachment to the housing 70, as described further hereinafter.

The air bag module 20 includes an air bag 30 which is made of any suitable flexible air bag material. The air bag 30 includes a mouth portion 31 through which the inflator gas is received. The edges of the mouth portion 31 include a plurality of fabric cushion tabs 32 which are preferably formed into loops by overlapping the air bag material. The mouth portion 31 of the air bag 30 further includes a plurality of cushion notches 33 which are alternated with the cushion tabs 32 around the mouth portion 31. The air bag 30 is normally stored within the housing 70 in a folded condition prior to air bag deployment. The mouth portion 31 is adapted for easy snap-fit attachment to the housing 70 via the air bag retainer 40, as described further hereinafter.

The module 20 further includes an air bag retainer 40 which includes a plurality of elongated rods 41, preferably including one on each side of the air bag mouth portion 31, for a total of four. However, it will be appreciated that more or less rods 41 may be used. The rods 41 are preferably made of a plastic or nylon material so that they can advantageously be recycled with the air bag 30 without disassembly. It will further be appreciated that the rods 41 could also be formed by overlapped or reinforced fabric air bag material and could be integrally formed with or sewn to the air bag 30. Preferably, the rods 41 are connected to the lower ends of the cushion tabs 32, such as by sliding through the loops formed by the cushion tabs 32. However, it will also be appreciated that the rods 41 may be attached to the cushion tabs 32 in any suitable manner, such as sewing. The rods 41 extend between two or more cushion tabs 32, such that the rods 41 extend across the cushion notches 33 to define a plurality of cushion openings 34 in the mouth portion 31 of the air bag 30.

As best shown in FIG. 1, the module 20 also includes the inflator 50 which preferably has an elongated cylindrical shape. The inflator 50 may be of any suitable construction for generating gas to inflate the air bag 30. The inflator 50 preferably includes a plurality of discharge ports 51 located at one of the ends of the inflator 50. The inflator 50 is adapted for axial insertion into the housing 70, preferably as the final component to the air bag module 20.

The housing 70 is preferably one-piece construction and integrally molded of a plastic material. However, it will be appreciated that the housing 70 could also be made by various other manufacturing methods, such as extruding, deep drawing, casting, or stamping. The housing 70 includes opposite side walls 71 and opposite end walls 72 to cooperatively define a generally rectangular housing opening 73, through which the air bag deploys. As best shown in FIG. 3, the housing 70 includes a bottom wall 74 which preferably includes an integrally formed diffuser 75 along the length or part of the length of the housing 70. The housing 70 also includes an integrally formed inflator mounting portion 76 which has a generally cylindrical shape for holding the inflator 50 therein. The inflator mounting portion 76 may include suitable spacer ribs 77 for offsetting the installed inflator 50 from the walls of the inflator mounting portion 76 for reducing friction during axial installation of the inflator 50 into the inflator mounting portion 76. Extending downward beneath the inflator mounting portion 76 is a housing flange 78 which is positioned for attachment to the mounting portion 19 on the underlying support structure 18, as shown in FIG. 3. The housing flange 78 is attached to the mounting portion 19 by any suitable method, such as welding or mechanical fasteners extending through housing apertures 79.

The housing 70 also includes a rim portion 80 which surrounds the housing opening 73. The rim portion 80 may preferably be thicker than the side and end walls 71, 72 of the housing 70. The housing side and end walls 71, 72 have exterior sides 81 located away from the deployment path of the air bag 30. The housing 70 includes a plurality of housing clips 82 which extend downward from the rim portion 80 of the housing 70. The housing clips 82 may preferably be integrally molded of a plastic material with the housing 70. However, it will be appreciated that depending on the construction of the housing 70, the clips 82 could also be extruded, crimped, or could be formed separately and attached to the exterior sides 81 of the side and end walls 71, 72. Preferably, the clips 82 are resiliently flexible such that they act as springs for permitting snap-fitted attachment of the air bag retainer 40 and cover door 60 to the housing 70, as described further hereinafter. As best shown in FIG. 3, the clips 82 each include a knobbed portion 83 which protrudes outwardly away from the side and end walls 71, 72 for increasing the overall dimensions of the housing 70. Advantageously, the knobbed portions 83 preferably have structural strength which is sufficient to support the weight of the housing 70, especially during installation to the vehicle 10, so that the cover door 60 does not need to perform this function. The clips 82 each preferably include a spring leg portion 84 extending downwardly from the respective knobbed portions 83. The leg portions 84 are preferably flexible for enabling snap-fitted attachment of the air bag retainer 40 and cover door 60 to the housing 70, as described further hereinafter. The clips 82 each include a clip pocket 87 therein defined behind the knobbed portions 83. The clip pockets 87 are preferably shaped for snap-fitted attachment with the rods 41 of the retainer 40, as described further hereinafter.

Figure 2:
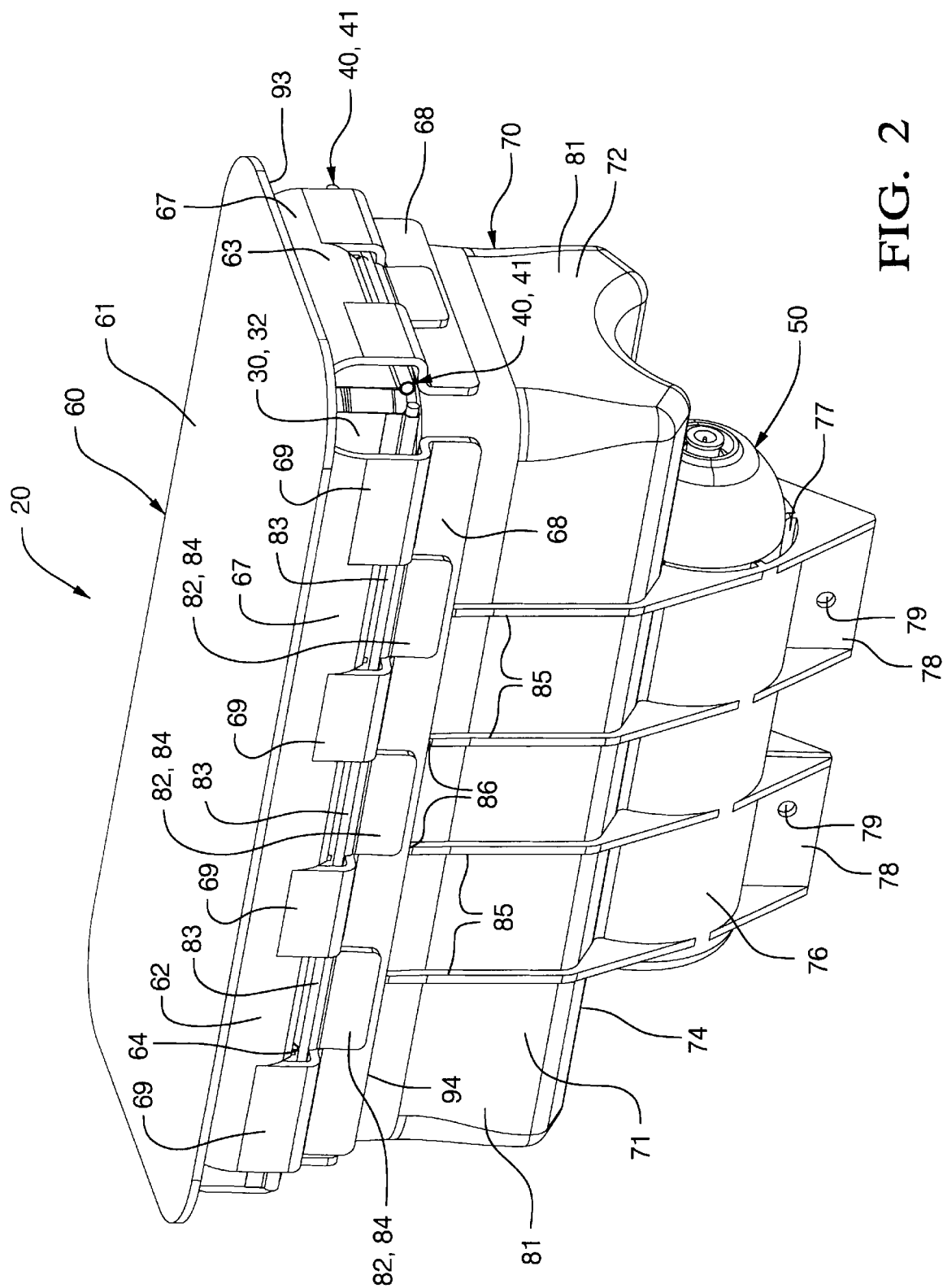
FIG. 2 is an assembled view of the module of FIG. 1.

The housing 70 also includes a plurality of vertical housing ribs 85 located on the exterior sides 81 of the side walls 71. The housing ribs 85 are used to strengthen the housing 70 during air bag deployment. Although not shown, housing ribs 85 could also be provided on the end walls 72. As best shown in FIG. 3, the housing ribs 85 are also advantageously positioned for serving an additional function of supporting the cover door 60 on the housing 70 by interaction of the cover door 60 with the upper rib edges 86, as best shown in FIGS. 2 and 3. The upper rib edges 86 are preferably spaced a predetermined amount below the clip pockets 87 for an interference fit with the cover door 60, as described further hereinafter.

The cover door 60 is preferably integrally molded from a plastic material. The cover door 60 includes an upper show wall 61 and opposing cover side walls 62 and cover end walls 63 extending generally downward from the upper show wall 61. The cover side and end walls 62, 63 each include an upper flange 67 extending directly from the upper show wall 61 and a lower flange 68 which is partially connected to the upper flange 67 by a plurality of flexible cover tabs 69. It will be appreciated from FIG. 3, that the cover tabs 69 are sufficiently long and flexible such that the upper show wall 61 of the cover door 60 can be variably positioned relative to the housing 70. Alternating between the cover tabs 69, the cover side and end walls 62, 63 each include a plurality of slotted cover openings 64 each including an upper edge 65 and a lower edge 66. The cover openings 64 are sized and shaped for receiving respective clips 82 of the housing 70 therethrough. The distance between the upper edge 65 and the lower edge 66 of each cover opening 64 is set for closely receiving the rods 41 of the air bag retainer 40 and the clips 82 therein and is preferably less than the height of the cover tabs 69.

The cover side and end walls 62, 63 are preferably offset slightly inward from the upper show wall 61, as best shown in FIG. 3, such that a bottom surface 93 of the upper show wall 61 rests on the upper ledge portion 14 of the instrument panel 11 when the module 20 is installed. The interaction of the upper show wall 61 with the upper ledge portion 14 prevents inward movement on the cover door 60 when pushed down upon, such as by a vehicle passenger. Advantageously, since the clips 82 of the housing 70 bear the weight of the module 20, which is normally carried by the cover door 60 in the prior art, the cover door 60 can be less structural and does not need to carry any load from the module 20. This also allows the flexible tabs 69 to be unloaded so that the upper show wall 61 of the cover door 60 can be variably positioned relative to the housing 70 within the tolerance of the slack in the cover tabs 69 during vehicle installation. Advantageously, the flexible structure of the cover tabs 69 allows the upper show wall 61 of the cover 60 to be variably positioned both vertically and horizontally relative to the housing 70, as enabled by the housing clips 82 relieving the load on the cover door 60. This enables a better fit of the cover door 60 within the instrument panel opening 12.

The module 20 is easily assembled as follows. As best shown in FIG. 1, the rods 41 of the air bag retainer 40 are suitably attached to the mouth portion 31 of the air bag 30, such as by sliding the rods 41 into the loops of the cushion tabs 32. Next, the mouth portion 31 of the air bag 30 is pulled down over the housing clips 82 until the clips 82 are aligned for insertion into the cushion openings 34. Next, the mouth portion 31 is pulled upward such that the clips 82 are inserted through the respective cushion openings 34 and the rods 41 of the retainer 40 deflect the spring leg portions 84 until the rods 41 are snapped into the clip pockets 87, as best shown in FIG. 3. The folded portion of the air bag 30 may be placed within the housing 70 either before or after attachment to the clips 82. The spring leg portions 84 preferably hold the retainer 40 in the closely-shaped clip pockets 87 prior to attachment of the cover door 60.

Advantageously, the air bag 30 is easily attached to the exterior sides 81 of the housing 70 without the use of fasteners.

Next, the cover door 60 is easily snap-fittedly attached to the housing 70. The cover door 60 is pulled over the rim portion 80 of the housing 70 until the slotted cover openings 64 are aligned with the spring leg portions 84 of the clips 82. Then the spring leg portions 84 are inserted through the cover openings 64 and the cover openings 64 are pulled up into the clip pockets 87 such that the lower edges 66 of the cover openings 64 wedge the rods 41 into the clip pockets 87, as best shown in FIG. 3. The upper edges 65 of the cover openings 64 are wedged on the outside of the knobbed portions 83 of the clips 87. Thus, the cover door 60 is easily assembled to the outside of the housing 70 without the use of fasteners and by using the same housing feature of the clips 82 for attachment of both the air bag 30 and the cover door 60. It will be appreciated that in the assembled condition, the cover door 60 can be variably positioned relative to the housing 70 as enabled by the flexible cover tabs 69.

It will be appreciated that the lower flange edges 94 of the lower flanges 68 of the cover door 60 can be wedged atop the housing ribs 85 to further secure the cover door 60 and air bag retainer 40 within the clips 82 until assembly to the vehicle 10. Finally, the inflator 50 may be axially inserted into the inflator mounting portion 76 and suitably secured therein, such as by a nut 53.

The module 20 is easily assembled to the vehicle 10 as follows. Referring to FIG. 3, the module 20 is lowered into the instrument panel opening 11 and the clips 82 may deflect inwardly as they pass by the upper ledge portion 14. Since the knobbed portions 83 are larger than the secondary instrument panel opening 43, the lowering of the module 20 is continued until the knobbed portions 83 of the housing clips 82 rest on the lower ledge portion 17 of the instrument panel 11. It will be appreciated that the housing clips 82 are strong enough to support the weight of the module 20 during installation. Advantageously while the module 20 is supported by the clips 82 on the housing 70, the lower housing flange 78 can be suitably secured to the mounting portion 19 of the support structure 18 to provide additional support to the module 20 and for lateral stability. It will be appreciated that the housing flange 78 can be secured such as by welding or by mechanical fasteners (not shown). If attachment is by mechanical fasteners, the housing apertures 79 or respective apertures on the support structure 18 can be vertically elongated for variable attachment locations as enabled by the module 20 being supported on the housing clips 82 during the installation process. If attachment is by welding, then the welding location can be varied and determined as the module 20 is installed in the vehicle 10. After installation, the bottom surface 93 of the upper show wall 61 of the cover door 60 is centered in the instrument panel opening 12 atop the upper ledge portion 14. It will be appreciated that the flexible cover tabs 69 enable the cover door 60 to be variably positioned relative to the housing 70. Thus, despite the tolerance variations in the distance between the instrument panel 11 and the mounting portion 19 on the underlying support structure 18, the cover door 60 can be easily aligned in the instrument panel opening 11. Furthermore, it will be appreciated that in the installed condition shown in FIG. 3, the clips 82 of the housing 70 support the weight of the module 20 prior to attachment of the module 20 to the support structure 18, such that the cover door 60 does not need to perform that function and can be made of a lighter, less structural material.

As best shown in FIG. 3, it will be appreciated that when the module 20 is installed in the vehicle 10, the spring leg portions 84 are deflected inward by the lower ledge portion 17 of the instrument panel 11. Thus, the lower ledge portion 17 presses the spring leg portions 84 against the lower flange 68 of the cover door 60 and traps the cover door 60 and retainer 40 within the housing clips 82.

Upon the sensing of predetermined vehicle conditions, the inflator 50 will generate gas to inflate the air bag 30 for deployment out through the instrument panel opening 11. The cover door 60 includes suitable weakened portions (not shown) which break open to permit deployment of the air bag 30. Upon air bag deployment, the rods 41 of the retainer 40 are trapped beneath the clips 82 such that the air bag 30 remains securely attached to the housing 70 during deployment.

It will be understood that a person skilled in the art may make modifications to the preferred embodiment shown herein within the scope and intent of the claims. For example, although the module 20 is shown for use with an instrument panel 11, this arrangement can also be used in other vehicle locations such as door panels, seat panels, and steering wheel panels. Although the knobbed portions 83 are shown as outward protrusions on the clips 82, it will be appreciated that the knobbed portions 83 could have many different shapes and could be attached directly to the housing 70, separate from the clips 82, as long as they are sufficiently strong to hold the weight of the module 20, especially during installation.

While the present invention has been described as carried out in specific embodiments thereof, it is not intended to be limited thereby but is intended to cover the invention broadly within the scope and spirit of the appended claims.

What is claimed is:

1. An air bag assembly for use in a vehicle, the air bag assembly comprising:
   an air bag including a mouth portion having a plurality of alternating cushion tabs and cushion notches;
   a housing including a plurality of resilient clips integrally formed thereon; and
   an air bag retainer including at least one rod portion extending between at least two cushion tabs and extending across the cushion notches to define cushion openings, the clips being received through the cushion openings cooperatively defined by the cushion notches and the rod portion such that the rod portion is snap-fittedly engaged beneath the clips to secure the air bag to the housing.

2. The air bag assembly of claim 1 wherein the rod portion is made of a nylon material.

3. The air bag assembly of claim 1 wherein the air bag is made of a fabric cushion material and wherein the cushion tabs are formed by overlapping the cushion material.

4. The air bag assembly of claim 1 wherein the clips each include a downwardly extending spring leg portion and a clip pocket shaped for closely receiving the rod portion therein and wherein the rod portion is snap-fittedly engaged with the clip pocket.

5. An air bag assembly in a vehicle comprising:
   an air bag including a mouth portion having a plurality of alternating cushion tabs and cushion notches;
   a housing including a plurality of resilient clips thereon; and
   an air bag retainer including at least one rod portion extending between at least two cushion tabs and extending across the cushion notches to define cushion openings the cushion openings adapted for receiving the clips therethrough such that the rod portion is snap-fittedly engaged beneath the clips to secure the air bag to the housing;
   the vehicle including a vehicle panel and wherein the vehicle panel pushes against the clips to trap the rod portion in the clips when the air bag assembly is installed in the vehicle.

6. An air bag assembly in a vehicle comprising:
   an air bag including a mouth portion having a plurality of alternating cushion tabs and cushion notches;
   a housing including a plurality of resilient clips thereon; and
   an air bag retainer including at least one rod portion extending between at least two cushion tabs and extending across the cushion notches to define cushion openings the cushion openings adapted for receiving the clips therethrough such that the rod portion is snap-fittedly engaged beneath the clips to secure the air bag to the housing;
   the vehicle includeing a vehicle panel and wherein the clip includes a knobbed portion and wherein the knobbed portion engages the vehicle panel and supports the air bag assembly during installation in the vehicle.

7. An air bag assembly for use in a vehicle, the air bag assembly comprising:
   a housing including a plurality of downwardly extending clips thereon;
   a cover door including an upper show wall, the cover door including a plurality of flexible cover tabs extending beneath the upper show wall, the cover door having a plurality of cover openings positioned between the cover tabs;
   the clips for extending through the cover openings for holding the cover door on the housing;
   whereby the flexible cover tabs permit variable positioning of the upper show wall relative to the housing; and
   the cover door including a downwardly extending side wall having an upper flange and a lower flange and wherein the cover tabs extend between and loosely connect the upper flange to the lower flange and wherein the cover openings are formed between the upper and lower flanges.

8. An air bag assembly in a vehicle, the air bag assembly comprising:
   a housing including a plurality of downwardly extending clips thereon;
   a cover door including an upper show wall, the cover door including a plurality of flexible cover tabs extending beneath the upper show wall, the cover door having a plurality of cover openings positioned between the cover tabs;
   the clips for extending through the cover openings for holding the cover door on the housing;
   whereby the flexible cover tabs permit variable positioning of the upper show wall relative to the housing; and
   the vehicle including a vehicle panel and wherein the housing includes a knobbed portion protruding outwardly from the housing and wherein the knobbed portion engages the vehicle panel to support the air bag assembly during installation in the vehicle.

9. The air bag assembly of claim 8 wherein the vehicle panel has an upper ledge portion and a lower ledge portion and wherein the knobbed portion engages the lower ledge portion and supports the weight of the air bag assembly and wherein the cover door rests atop the upper ledge portion when the air bag assembly is installed in the vehicle and wherein the flexible cover tabs are free from load when the module is supported on the lower ledge portion whereby the cover door may be variably positioned within the upper ledge portion.

10. An air bag assembly in a vehicle, the air bag assembly comprising;

a housing having exterior sides and including outwardly extending knobbed portions on the exterior side;

a vehicle panel including a first opening surrounded by an upper ledge portion, the panel including a secondary opening surrounded by a lower ledge portion and positioned beneath the upper ledge portion, the secondary opening being smaller than the first opening; and the housing be sized for extending entirely through the first opening and partially through the secondary opening, the knobbed portions for engaging the lower ledge portion such that the air bag assembly is supported by engagement of the knobbed portions with the lower ledge portion.

11. The air bag assembly of claim 10 wherein the module includes a cover door attached to the housing, the cover door including a plurality of flexible cover tabs for variable positioning of the cover door relative to the housing, the cover tabs being free from load of the module by the interaction of the knobbed portions with the lower ledge portion, and the cover door being variably positionable via the flexible cover tabs for mating alignment with the upper ledge portion upon installation of the air bag assembly within the vehicle.

* * * * *